(12) United States Patent
Perry

(10) Patent No.: US 6,391,485 B1
(45) Date of Patent: May 21, 2002

(54) METHOD AND APPARATUS FOR PURGING A FUEL CELL SYSTEM WITH COOLANT

(75) Inventor: Michael L. Perry, Glastonbury, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 70 days.

(21) Appl. No.: 09/625,948

(22) Filed: Jul. 26, 2000

(51) Int. Cl.[7] ................................................ H01M 8/00
(52) U.S. Cl. ............................ 429/13; 429/12; 429/25; 429/26; 429/38
(58) Field of Search ............................. 429/12, 13, 25, 429/26, 38

(56) References Cited

U.S. PATENT DOCUMENTS

| | | | |
|---|---|---|---|
| 5,503,944 A | 4/1996 | Meyer et al. | 429/13 |
| 5,700,595 A | 12/1997 | Reiser | 429/13 |
| 5,853,909 A | 12/1998 | Reiser | 429/13 |
| 6,013,385 A | * 1/2000 | DuBose | 429/17 |
| 6,268,074 B1 | * 7/2001 | Siepierski et al. | 429/13 |

* cited by examiner

*Primary Examiner*—Carol Chaney
*Assistant Examiner*—Dah-Wei D. Yuan
(74) *Attorney, Agent, or Firm*—Stephen A. Schneeberger

(57) ABSTRACT

A fuel cell power plant system (10) having a membrane/electrode assembly (MEA) (21,22,23) fuel cell stack (11) is provided with the method and means for inerting the MEA through use of the coolant to effect a purge. Under normal on load operation, fuel flows through a fuel reactant flow path (30) at the anode side(s) of the stack (11), oxidant flows through an oxidant reactant flow path (29) at the cathode side(s) of the stack (11), and the coolant, typically water, flows through the coolant flow path (32,31) of the stack (11). However, during transient operations of shutdown and/or start-up, the coolant is at least temporarily redirected to one, or both, of the fuel and the oxidant reactant flow paths (30/29) in lieu of their respective supplies of fuel and oxidant. This serves to purge the respective reactant(s) from the respective flow path(s). To provide sufficient supply of coolant for the purge, the supply of coolant to the coolant flow path (32,31) may be reduced or terminated. The control of flow of the reactants and coolant is accomplished via a network of valved fluid conduits (43,44,47,48,52,54,52',54', 52",54",64,66,62, 70,64",66",60,68,64',66'), typically under direction of an automatic controller (72). Coolant sensors (80,82) positioned near the outlets of the reactant flow paths from stack (11) may indicate the arrival of coolant at those respective outlets to effect an appropriate control action.

14 Claims, 7 Drawing Sheets

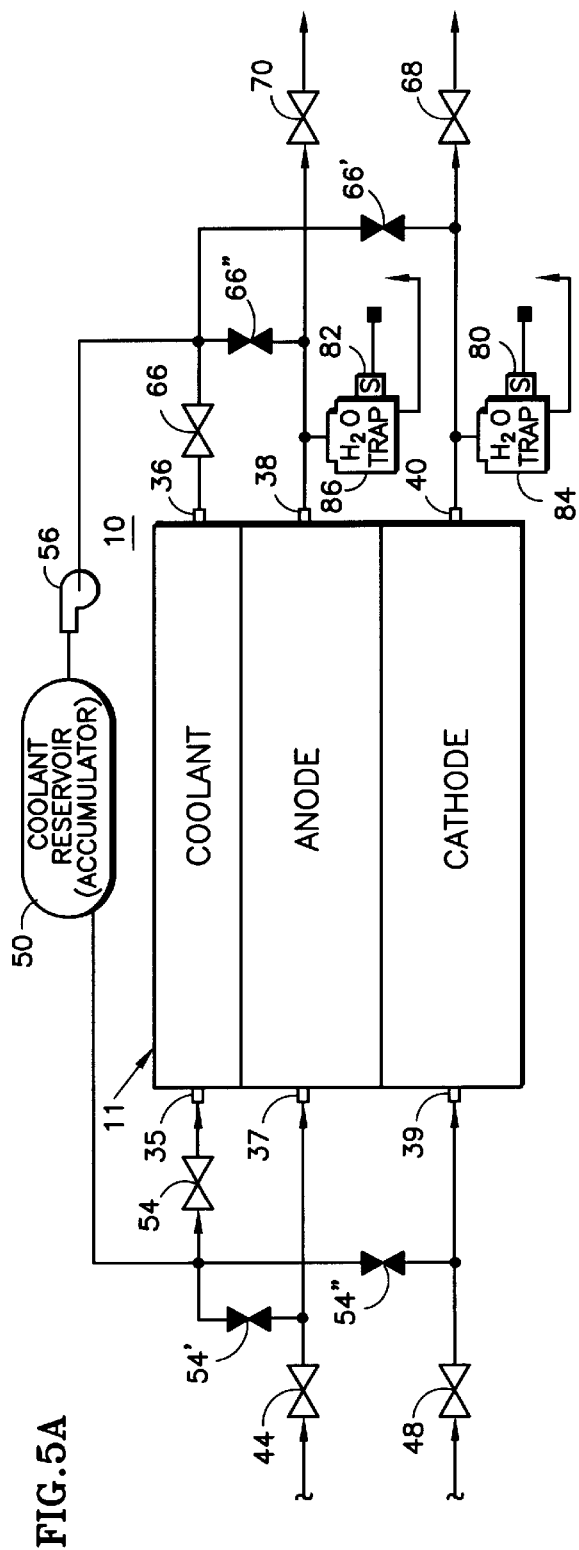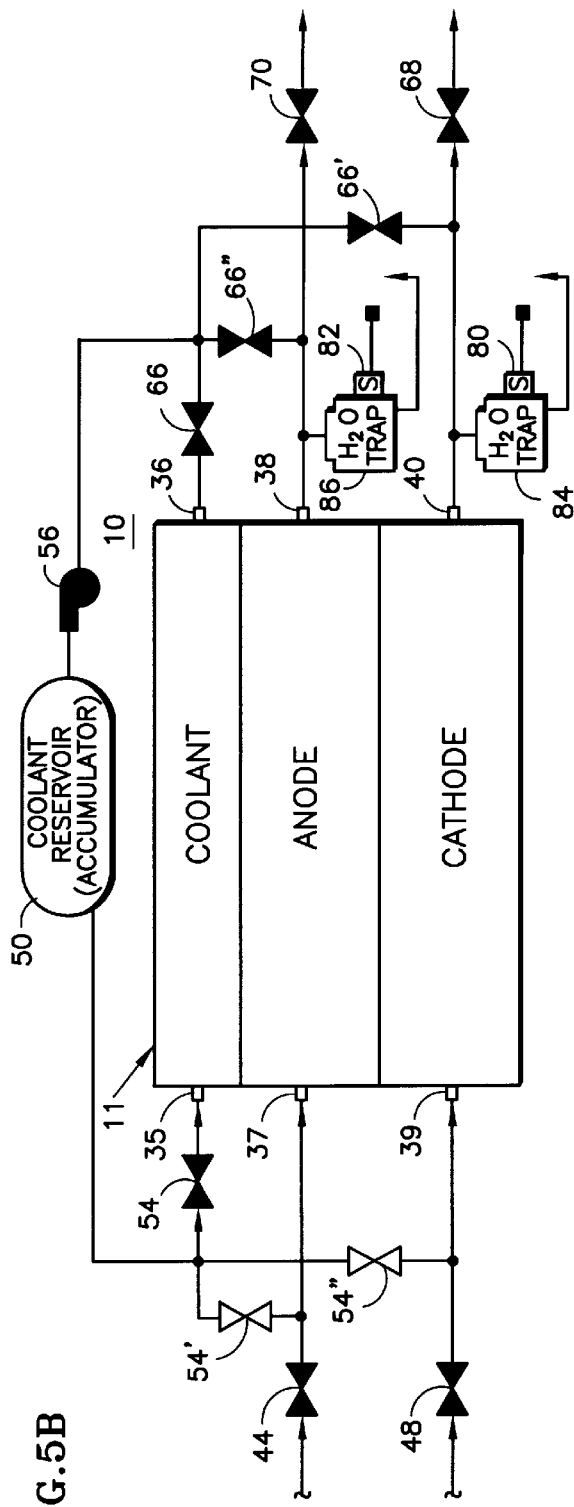
FIG.5A
FIG.5B

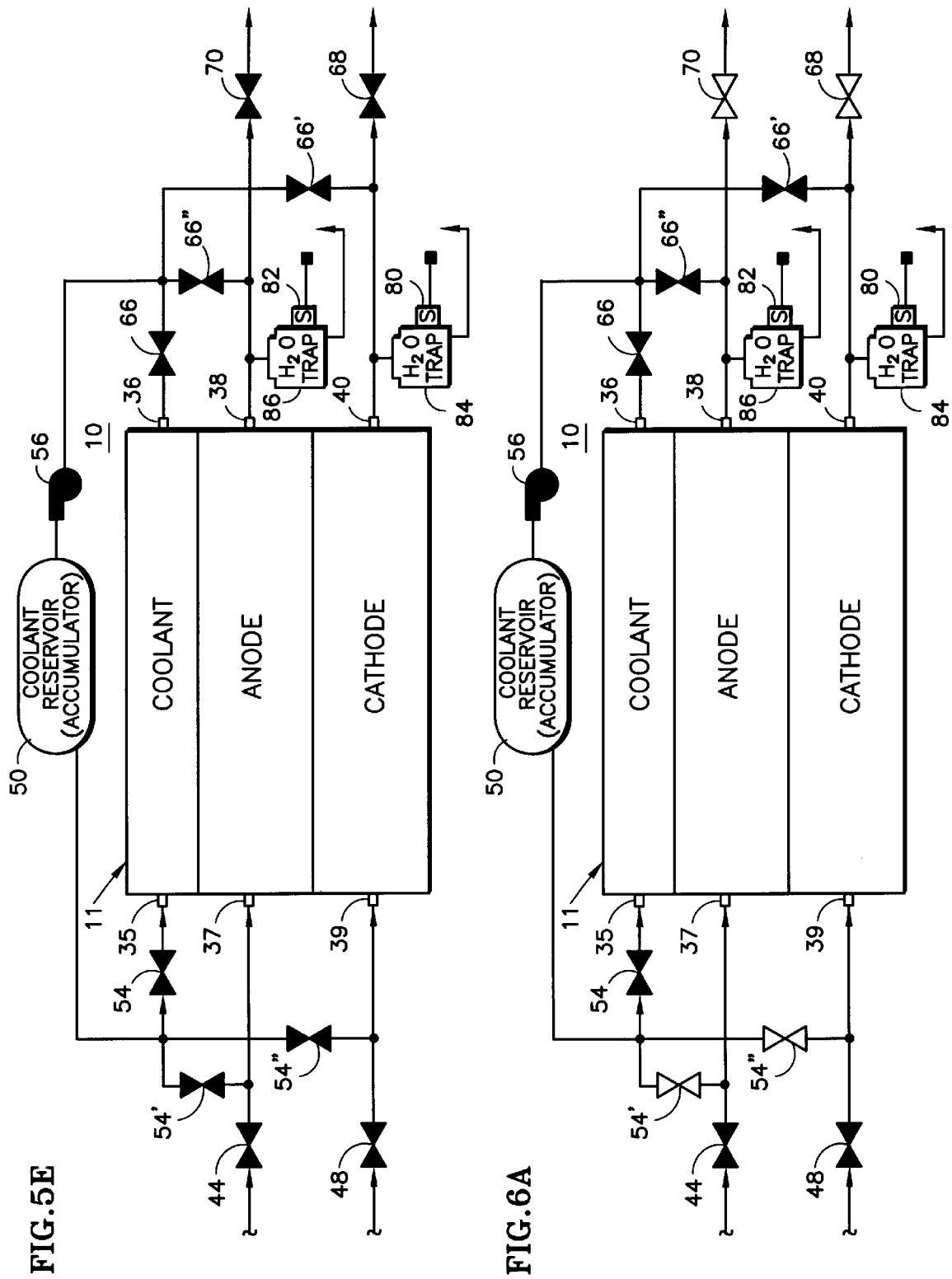

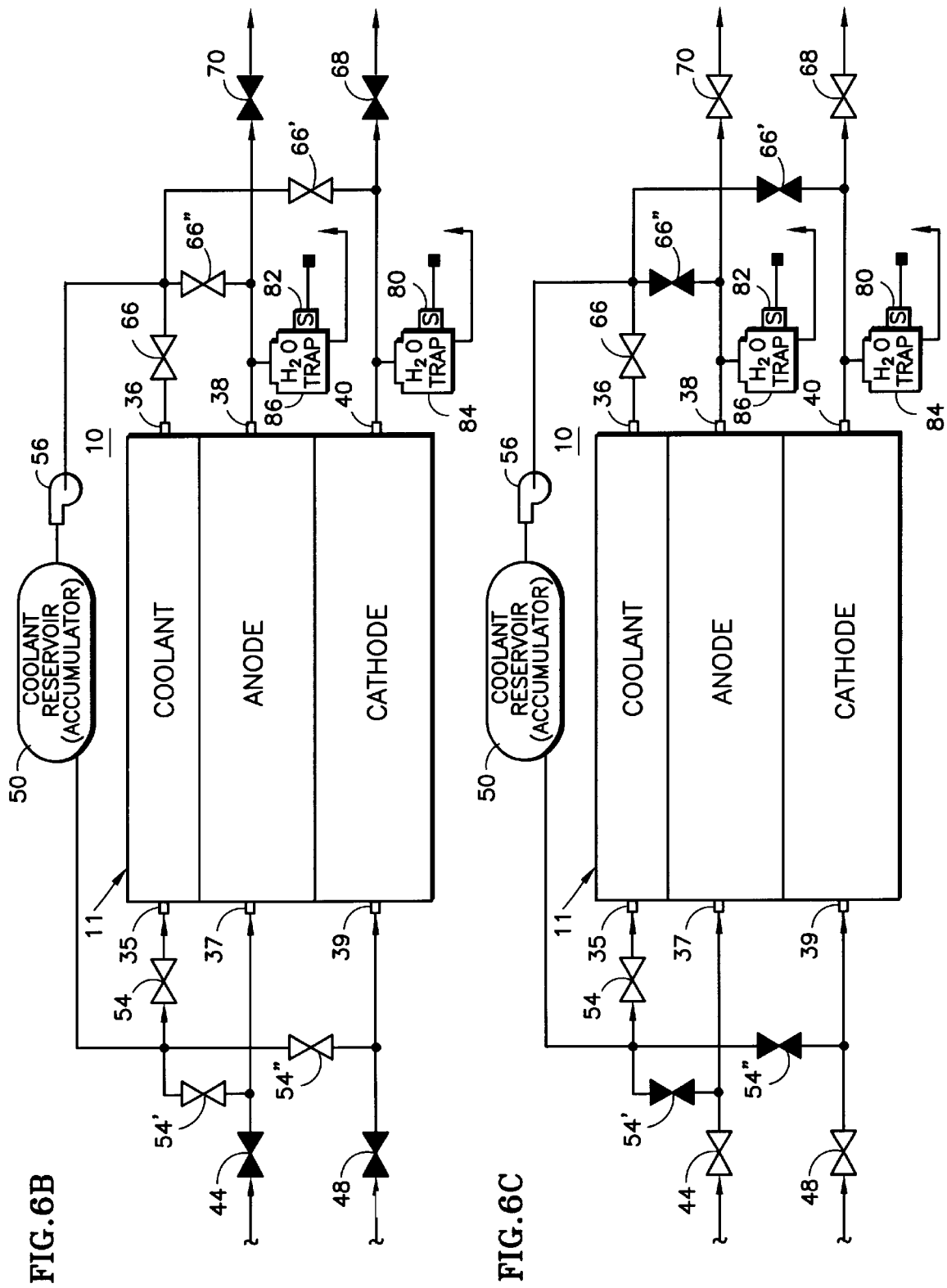

METHOD AND APPARATUS FOR PURGING A FUEL CELL SYSTEM WITH COOLANT

TECHNICAL FIELD

This invention relates generally to fuel cells, and more particularly to a system and method for purging a fuel cell system with coolant.

BACKGROUND ART

Fuel cell systems are electrochemical power sources for both stationary and mobile applications. One type of fuel cell employing a solid polymer electrolyte membrane (PEM) has shown particular promise as an automotive power source. That type of fuel cell includes a membrane/electrode assembly (MEA), with fuel, oxidant and coolant flow fields adjacent to the anode and cathode electrodes. The PEM fuel cells operate at relatively low temperatures, thus facilitating their application to automotive uses. Fuel cells do, however, have a characteristic that may present a drawback, particularly in automotive applications which typically require frequent shutdown and startup of the fuel cell.

Unless the fuel cell is in some way purged or otherwise inerted when it is being shutdown and started up, undesirable processes and reactions may occur, or continue to occur. If the MEA of the fuel cell is not protected, as by inerting the anode and/or cathode flow fields by flooding with a purge gas, the chemical processes may occur in some form, and lead to undesirable results. Normally it is intended for the output voltage from the fuel cell to be reduced or terminated at shutdown, however the failure to inert may allow the process to continue in a way that depletes fuel volume on the anode side and creates a vacuum. If the system is not sufficiently leak tight, air may be drawn into the fuel side and lead to unwanted results. Similar concerns exist during start-up in order to avoid gas interfaces which may give rise to unwanted reactions at that time.

It has been observed that the failure to adequately inert a fuel cell system may allow a fuel/oxidant (air) interface to exist, even if temporarily, at regions in the fuel cell, and such interface may lead to serious safety concerns, as well as degradation in the performance and life of the cell.

Although the desirability of inerting fuel cells is well known and has typically been accomplished through the use of an inert purge gas such as nitrogen, that particular process may detract from the overall economics and efficiency of fuel cell use. More particularly, the need to obtain, transport and/or frequently refill a source of inerting gas such as nitrogen is a significant obstacle to the acceptance and use of fuel cells as an automotive power source. The use of an inert gas bottle adds undesirable weight, volume and complexity, and should be avoided if possible. To mitigate or avoid this obstacle, other techniques have been advanced as alternatives to the use of inert purge gas to inert fuel cells.

In one alternative, described in U.S. patent application Ser. No. 09/133,768, filed Aug. 8, 1998 for "Self-Inerting Fuel Cell System", and assigned to the assignee of the present invention, fuel, oxidant and coolant are individually controlled and caused to flow through respective flow fields in fine pore plates adjacent the anode and cathode sides of a membrane/electrode assembly in a PEM type fuel cell. Through selective control of the relative pressures of the fluids in the respective fuel, oxidant and coolant flow fields, coolant is permitted, at shutdown, to migrate through the fine pore plates and flood the fuel and oxidant (collectively "sreactants") flow fields, thereby displacing the reactants and inerting the fuel cell system.

While the aforementioned Self-Inerting system of U.S. Ser. No. 09/133,768 does provide a means of inerting a fuel cell without requiring the cost and inconvenience of a nitrogen purge, it relies solely on the mechanism of the coolant migrating through the fine pore plates and displacing (i.e., purging) the reactants. Although such mechanism may be sufficient in many instances, in other instances it may be preferable to utilize the coolant as a purge or inerting agent in a more conventional manner, either alternatively or supplementally. The foregoing needs and preferences exist not only when shutting down the fuel cell, but also during start-up.

In view of the foregoing, it is an object of the present invention to provide a fuel cell inerting system which overcomes the limitations and disadvantages of prior fuel cell systems, and particularly prior inerting/purging systems for fuel cells. Other objects and advantages of this invention will become more readily apparent when the following description is read in conjunction with the accompanying drawings.

DISCLOSURE OF THE INVENTION

The present invention is a system for protecting fuel cells, especially of the PEM type, particularly during transient periods such as start-up and shut down.

Accordingly, the present invention relates to an inerting system, both method and apparatus, for a fuel cell stack of the type that has a membrane/electrode assembly (MEA), which MEA includes anode and cathode electrode catalyst layers on respective opposite sides of the membrane, and wherein the fuel cell stack has a fuel reactant flow path on the anode side of the MEA, an oxidant reactant flow path on the cathode side of the MEA, and a coolant flow path in fluid communication with the anode and the cathode sides of the MEA, and further wherein the fuel reactant flow path, the oxidant reactant flow path and the coolant flow path each have a respective inlet to and a respective outlet from the fuel cell stack, and wherein a fuel reactant supply, an oxidant supply and a coolant supply are applied to the fuel reactant inlet, the oxidant reactant inlet and the coolant inlet during normal on load operation of the stack.

More specifically, the invention relates to the method and apparatus for purging such fuel cell stack with coolant, typically water, during the transient operations of start-up and shutdown. Appropriate means and processes are provided to redirect the supply of coolant from the coolant flow path inlet to one, the other, or both of the inlets to the fuel reactant and oxidant reactant flow paths. Similarly, feed of the supplies of fuel and/or oxidant to those respective inlets is terminated or provided in a controlled sequence. The admission of coolant to either, or both, of the fuel reactant or oxidant reactant flow paths serves to displace the respective reactant and to inert the respective anode and/or cathode when the reactant has been completely displaced. Similarly, reintroduction of the respective reactants displaces the coolant and returns the system to a condition for on load operation. Sensor(s) at the outlets of the respective reactant flow paths indicate when coolant has displaced the respective reactant, to thereby signal or control completion of one operation and initiation of another.

For shutdown, one, or both, of the fuel and oxidant reactant flow paths may be purged with system coolant in the foregoing manner. Similarly, for start-up, one, or both, of the fuel and oxidant reactant flow paths is purged with system coolant to inert the respective anode and/or cathode during that phase.

The foregoing features and advantages of the present invention will become more apparent in light of the following detailed description of exemplary embodiments thereof as illustrated in the accompanying drawings.

BRIEF DESCRIPTION OF DRAWINGS

FIGS. 5A–5E schematically depict, in sequence, the states of various control devices of FIG. 4 as the fuel cell system is shut down; and FIGS. 6A–6C schematically depict, in sequence, the states of various control devices of FIG. 4 as the fuel cell system is started up.

BEST MODE FOR CARRYING OUT THE INVENTION

Figure 1:
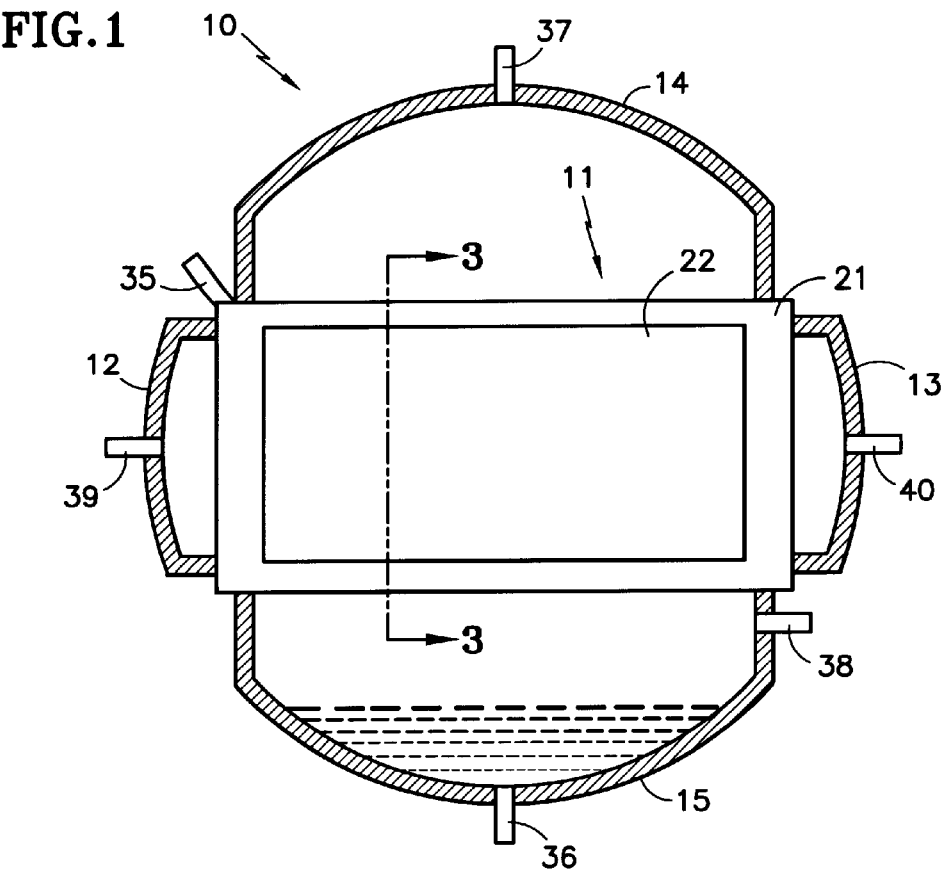
FIG. 1 is a somewhat schematic cross sectional view of a proton exchange membrane fuel cell used in a fuel cell power plant in accordance with the invention.
Figure 2:
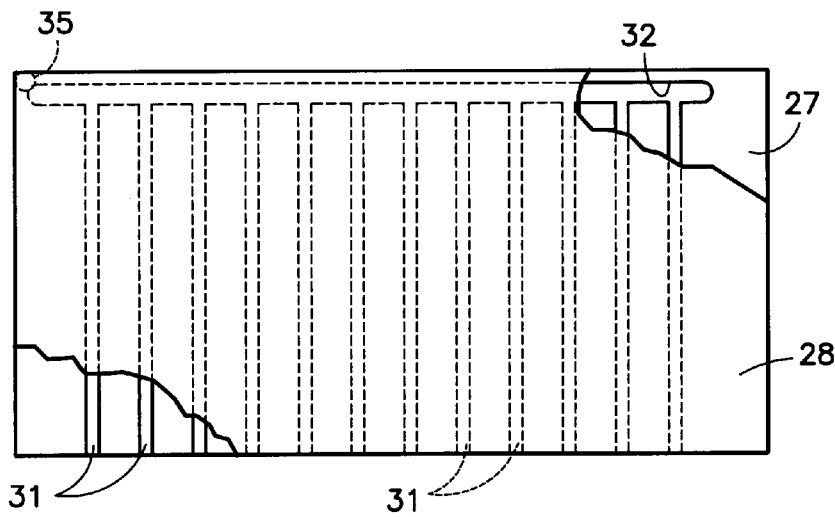
FIG. 2 is a front elevational view; partly broken away, of one of the fine pore plate water coolant separator plate assemblies formed in accordance with the invention.
Figure 4:
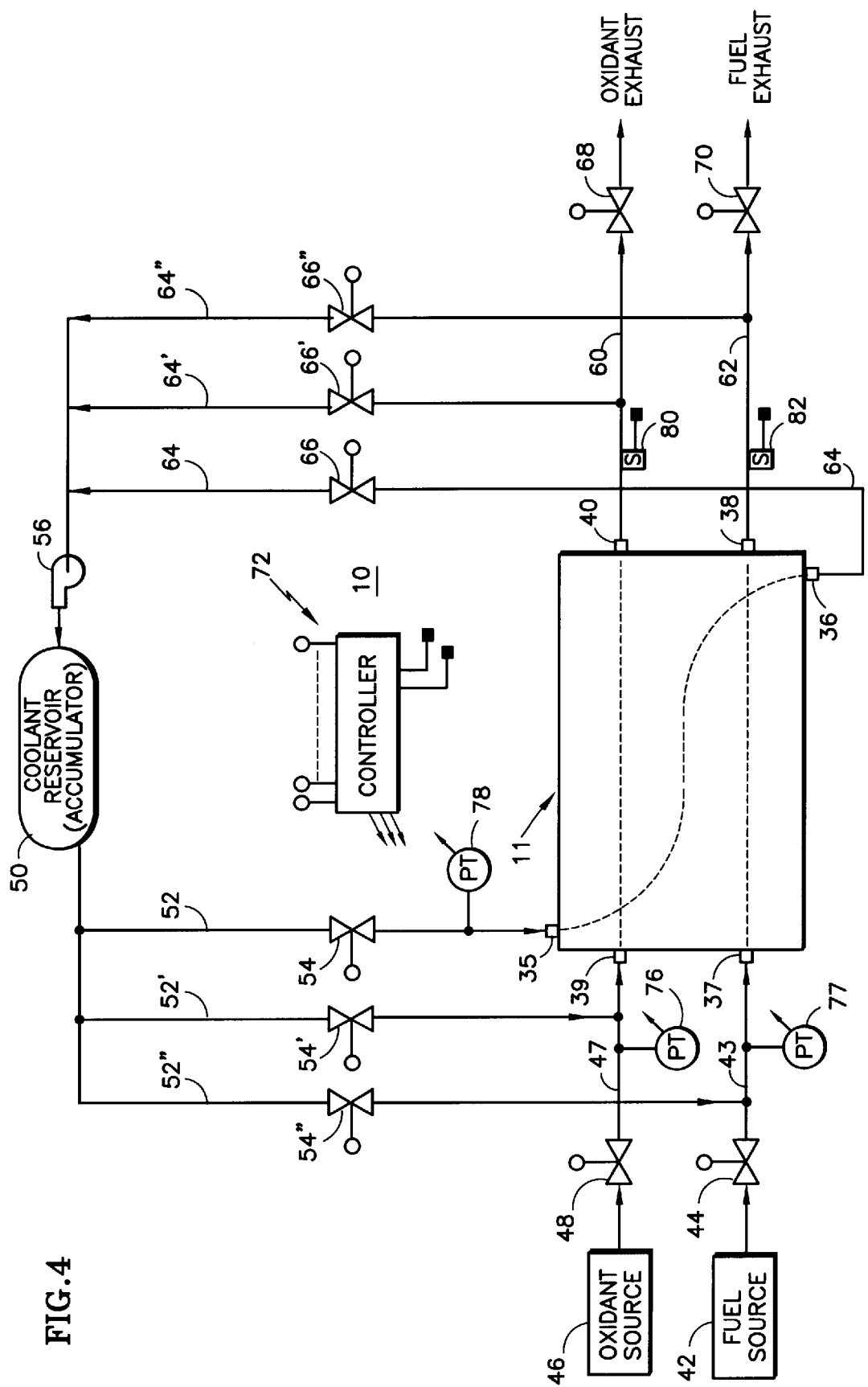
FIG. 4 is a schematic view of a system employed in the power plant which will permit and provide the appropriate applications of coolant to the reactant flow path, or paths, to effect the requisite purging and inerting action of the invention.

Referring now to FIGS. 1 and 2, there is shown the fuel cell stack assembly (CSA) 11 portion of a fuel cell power plant system 10, which system 10 is shown in greater detail in FIG. 4. The CSA 11 includes a plurality of ion exchange membrane fuel cell assemblies (collectively referred to as the "stack"), an oxidant reactant gas inlet manifold 12, an oxidant gas outlet manifold 13, a fuel gas inlet manifold 14, and a fuel gas outlet manifold 15. The power plant system 10 additionally includes fluid conduits and various control means external to the fuel cell assemblies 11, to be described in greater detail hereinafter. In the CSA orientation shown in FIG. 1, the fuel outlet manifold 15 serves as a sump for collecting coolant and product water from the fuel cells 11, however it will be appreciated that a separate outlet manifold might alternatively be provided for the coolant. A cathode catalyst layer 22 is disposed on one surface of the ion exchange membrane 21, which membrane is typically a solid polymer electrolyte.

Coolant water flow fields are formed in juxtaposed fine pore plates 27 and 28 which are interposed between adjacent cells in the CSA 11. Coolant, in the disclosed embodiment, water, is supplied to the cells through the main distribution channels 32 and thence through a multitude of coolant channels 31 which are formed in the plates 27 and 28. Coolant water is transported from the water sump, or any other form of coolant outlet from the stack 11, and is returned, indirectly, as will be described in greater detail, to a water inlet port 35 that communicates with the main coolant water distribution channel 32. As coolant water flows through the channels 31, it penetrates and fills the pores of the plates 27 and 28 so as to prevent reactant gas cross-over between adjacent cells in the power plant.

Figure 3:
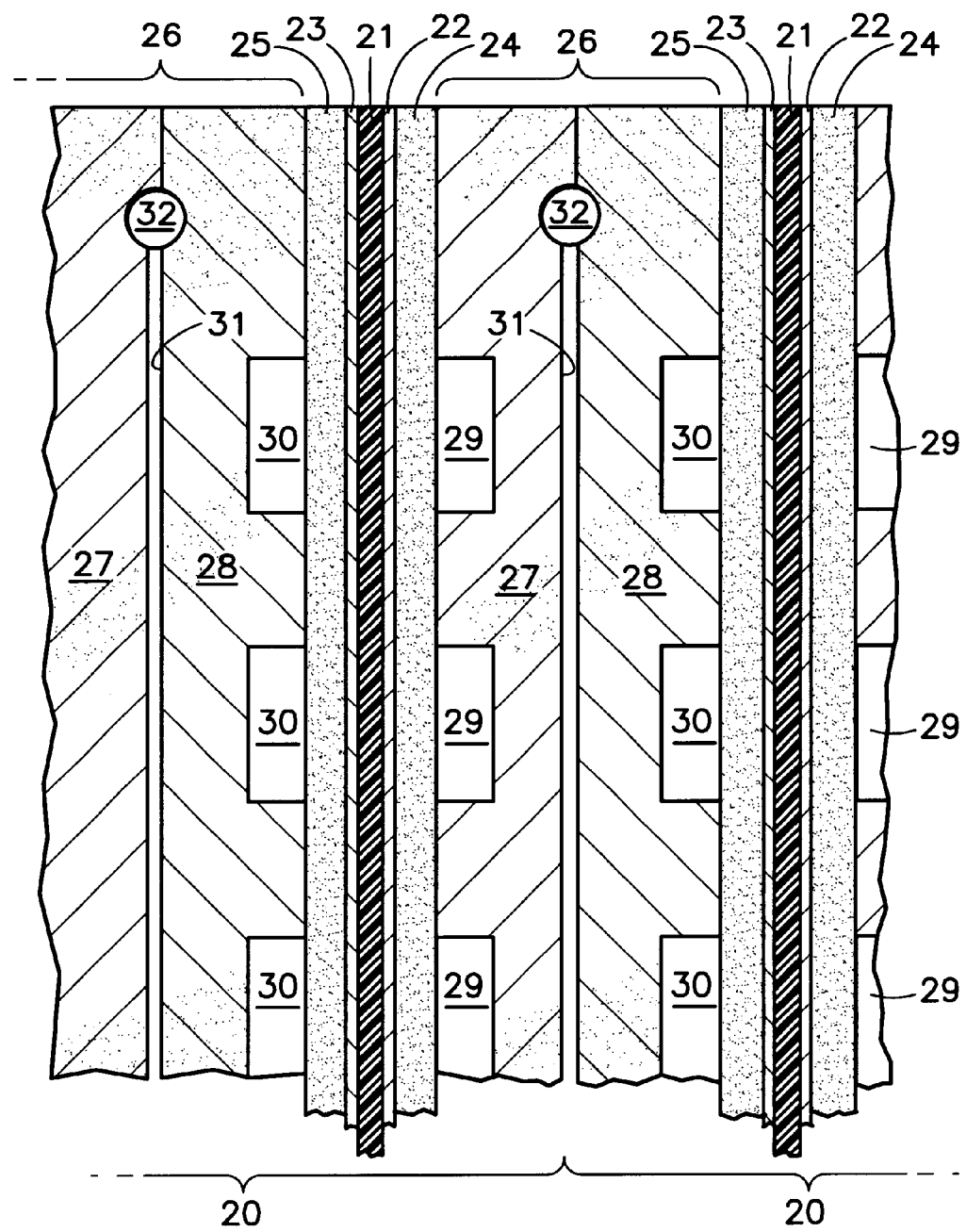
FIG. 3 is a sectional view taken along line 3—3 of FIG. 1.

Referring to FIG. 3, further details of the CSA 11 are shown. FIG. 3 shows portions of two identical, adjacent fuel cells 20 of the stack 11. It will be noted that, in addition to the cathode catalyst layer 22, the membrane 21 of the fuel cell 20 is provided with an anode catalyst layer 23. Collectively, the membrane 21, and the anode catalyst layer 23 and the cathode catalyst layer 22 on opposite sides thereof, comprise a membrane/electrode assembly, or MEA. Respective substrates 24 and 25 contact the catalyst layers 22 and 23. These substrates 24 and 25 may be hydrophilic, partly hydrophilic, or non-hydrophilic, depending on the design requirements of the stack assembly 11. Porous hydrophilic plate assemblies 26 are situated between adjacent cells in the CSA. The plate assemblies 26 are formed from separate plates 27 and 28 that are substantially identical in composition, pore size, and structure. In addition to including the coolant channels 31, the plate assemblies 26 also provide oxidant and fuel gas channels 29 and 30 respectively.

Referring now to FIG. 4, and also back to FIG. 1, it is convenient to view the fuel cell stack assembly 11 as having singular inlet ports, or inlets, and outlet ports, or outlets, for the coolant, the fuel reactant gas and the oxidant reactant gas, respectively. Accordingly, a coolant inlet port 35 serves as the normal inlet for coolant water, and coolant outlet port 36 at the sump of manifold 15 provides the respective normal outlet. Similarly, the fuel reactant inlet manifold 14 has fuel inlet port 37, and fuel reactant outlet manifold has fuel outlet port 38. Further, the oxidant reactant inlet manifold 12 has oxidant inlet port 39, and oxidant reactant outlet manifold 13 has oxidant outlet port 40.

Hydrogen-rich gas reactant is supplied to the fuel channels 30 from a pressurized fuel source 42, such as a supply tank or processing system, via fuel supply conduit 43 connected to fuel inlet 37. A fuel supply control valve 44 in conduit 43 controls and/or regulates the supply and pressure of fuel to the stack assembly 11. The oxidant channels 29 are supplied with oxidant reactant gas, such as air or a pressurized oxygen source 46, via oxidant supply conduit 47 connected to oxidant inlet 39. An oxidant supply control valve 48 in conduit 47 controls and/or regulates the supply and pressure of oxidant to the stack assembly 11. Similarly, under normal on load operation of the fuel cell power plant system 10, coolant water is supplied to the coolant channels 32,31 from a coolant reservoir or accumulator 50, via coolant supply conduit 52 connected to coolant inlet 35. The coolant water may be a combination of product water formed by the natural electrochemical reactions of the stack 11, as well as any supplemental make-up water that may be necessary. A coolant supply control valve 54 in conduit 52 controls and/or regulates the supply and pressure of coolant to the stack 11. The return supply of coolant to reservoir 50, as well as some regulation of the system coolant pressure, is provided by coolant pump 56. Coolant pump 56 is depicted as being between the outlet side of stack 11 and the inlet to the coolant reservoir 50 to apply suction to the stack 11, though other placement of the pump may be acceptable in other designs.

Following their respective use applications in the stack assembly 11 during normal on load functioning of the fuel cell power plant system 10, the fuel exits stack assembly 11 via outlet 38 and the exhaust conduit 62 connected thereto, the oxidant exits via outlet 40 and the exhaust conduit 60 connected thereto, and the coolant exits via outlet 36 and the exhaust and recirculation conduit 64 connected thereto. The coolant recirculation, or return, conduit 64 is normally connected to the coolant reservoir via the coolant pump 56, as shown, and includes a coolant exhaust control valve 66 in accordance with the invention. Further in accordance with the invention, the oxidant exhaust conduit 60 includes an oxidant exhaust control valve 68 and the fuel exhaust conduit 62 includes a fuel exhaust control valve 70. Still further, alternate, or supplemental, coolant exhaust return conduits 64' and 64" are connected to the oxidant exhaust conduit 60 and the fuel exhaust conduit 62, respectively. The alternate coolant exhaust return conduit 64' is connected to oxidant conduit 60 between oxidant outlet 40 and oxidant exhaust control valve 68, and includes a supplemental coolant control valve 66'. Similarly, the alternate coolant exhaust conduit 64" is connected to fuel conduit 62 between fuel outlet 38 and fuel exhaust control valve 70, and includes a supplemental coolant control valve 66". These supplemental coolant exhaust return conduits 64' and 64" are also connected as inputs to pump 56 via a common junction with coolant recirculation conduit 64.

Further in accordance with the invention, alternate, or supplemental, coolant supply conduits 52' and 52" are each connected at one end to the outlet of coolant reservoir 50 and, at their respective other ends, to the oxidant supply conduit 47 and the fuel supply conduit 43, respectively. The alternate coolant supply conduit 52' is connected to oxidant supply conduit 47 between oxidant supply control valve 48 and oxidant inlet 39, and includes a supplemental coolant control valve 54'. Similarly, the alternate fuel supply conduit 52" is connected to fuel supply conduit 43 between the fuel supply control valve 44 and the fuel inlet 37, and includes a supplemental coolant control valve 54".

A controller 72 provides coordinated control of the various controlled elements, and thus the functioning of, the fuel cell power plant system 10. For instance, each of the control valves 44, 48, 54, 54', 54", 66, 66', 66", 68, and 70 is depicted as having a control node or terminal representative of hard-wired or wireless connection with controller 72 for receiving control signals and/or transmitting state conditions. Additionally, the power plant system 10 includes pressure transducers 76, 77, and 78 connected to the oxidant supply conduit 47, the fuel supply conduit 43, and the coolant supply conduit 52, respectively, for sensing and indicating the oxidant, fuel, and coolant pressures, respectively. Further still, fluid condition sensors 80 and 82 are operatively connected to the oxidant exhaust conduit 60 and the fuel exhaust conduit 62, respectively, to determine, in each case, whether the fluid in the conduit at that location is coolant or the respective reactant. Thus, the sensors 80, 82 may be of any type which is capable of distinguishing between coolant and reactant. Because the coolant is typically in the liquid state and the oxidant and/or fuel reactant is/are in the gaseous state at that location, the sensors may be of a type which distinguishes between those states or some other distinguishing property. For instance, the sensors may measure dielectric properties, conductivity, visual opacity, viscosity, or some similar property. In the embodiment depicted in FIGS. 5 and 6 following, water traps collect liquid coolant water and the sensors 80, 82 are liquid level detectors which respond to the presence of a liquid level in the traps. These measurements are provided to the controller 72 for purposes to be explained. The controller 72 may also control other system elements, such as the actuation and speed of pump 56, and other control elements not shown and described.

Attention is now given to the operation of the fuel cell power plant system 10, during normal on load operation, shutdown, and start-up, with further reference first to FIGS. 5A–5E and next to FIGS. 6A–6C. It should be understood that the schematic depictions of FIGS. 5A–5E and 6A–6C are, in the main, simplified relative to the full system depiction of FIG. 4, and some conduit designations have been omitted from the drawings for clarity. Moreover, the "open" state of valves is depicted by a clear symbol and the "closed" state is depicted by a blackened symbol. A similar convention is used for the operating states of the pump 56.

Referring first additionally to FIG. 5A, during normal operation, fuel flows in and out of stack assembly 11 via fuel supply valve 44 and fuel exhaust valve 70, both of which are open. Similarly, oxidant flows in and out of CSA 11 via oxidant supply valve 48 and oxidant exhaust valve 68, both of which are open. The coolant water also flows through the stack assembly 11 via the coolant supply valve 54 and the coolant exhaust valve 66, which are also both open during this phase. The coolant is circulated by the coolant pump 56 which pumps coolant from the stack assembly 11 to the coolant reservoir 50. During normal operation, the supplemental coolant valves (inlet and exhaust) 54', 54", 66', and 66" are closed. The controller 72 (of FIG. 4) monitors the pressure sensors 76, 77, and 78 to maintain appropriate absolute and relative pressures of oxidant, fuel and coolant in the stack 11, via regulation of the various supply and exhaust valves, speed of pump 56, etc. Normally the pressures of fuel, oxidant and coolant are all within several psi of ambient pressure, with the fuel and oxidant pressures being greater than the coolant pressure by about 2 or 3 psi to maintain the coolant in the fine pore plates 27 and 28, but not in the oxidant channels 29 and fuel channels 30. An electrical load (not shown) is typically connected to the stack 11, and the system is said to be operating "on load".

In accordance with the invention, the fuel cell power plant system 10 is structured and operated during one, or both, of the transient conditions of shutdown and start-up so as to provide an active coolant purge of the stack 11 to prevent undesired reactions. During the shutdown process, and referring to FIG. 5B, the electrical load is removed, both the fuel supply valve 44 and the oxidant supply valve 48 are closed, the pump 56 is stopped or turned off, coolant supply valve 54 is closed, coolant exhaust control valve 66 is closed, the supplemental coolant supply valves 54' and 54" are opened to allow coolant water to flow, as by gravity, from the coolant reservoir 50 into the oxidant inlet 39 and the fuel inlet 37, respectively, and the oxidant exhaust control valve 68 and the fuel exhaust control valve 70 are closed. A short interval of inactivity is provided to allow the vacuum at the coolant inlet 35 to reach ambient, or 0.0 inches of water column, as monitored by pressure transducer 78.

Figures 5C, 5D:
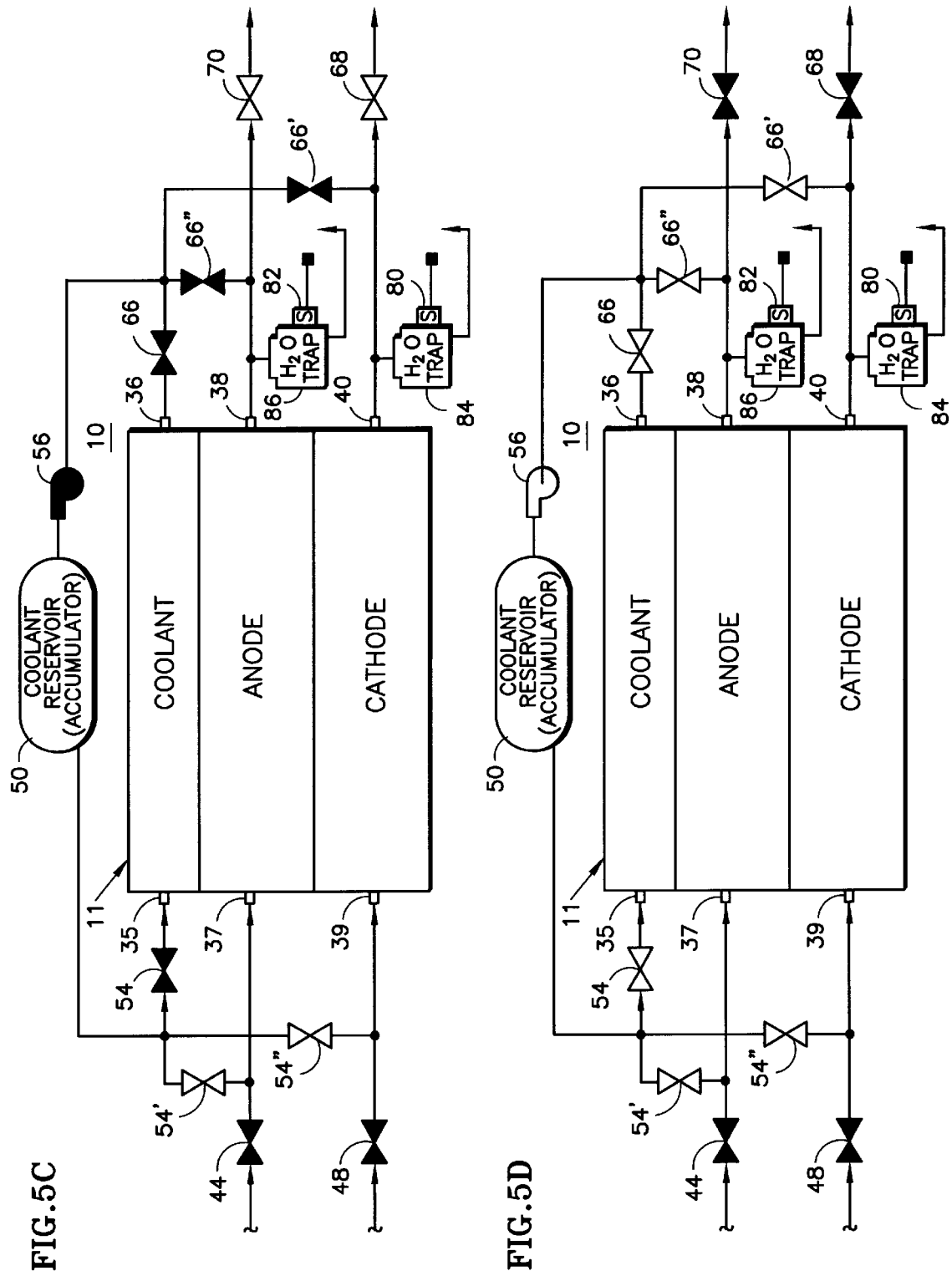

Next, referring to FIG. 5C, the oxidant exhaust control valve 68 and the fuel exhaust control valve 70 are re-opened, allowing the coolant to drain into the fuel inlet 37 and the oxidant inlet 39 to fill the fuel channels 30 (near the anode) and the oxidant channels 29 (near the cathode) in the stack assembly 11. The coolant is allowed to flow into and through the fuel and oxidant channels, until one, or preferably both, of the sensors 82 and 80 detect that coolant water is coming out of the fuel outlet 38 and/or the oxidant outlet 40. Such detection of the presence of coolant water is conveniently made by including water traps 84 and 86 at, or just downstream of, the oxidant outlet 40 and the fuel outlet 38, respectively, and including water level sensors 80 and 82 with the respective traps.

Upon detection of coolant water at the reactant outlets of the CSA 11, and referring to FIG. 5D, the fuel exhaust valve 70 and the oxidant exhaust valve 68 are then closed, the supplemental coolant exhaust control valves 66', and 66" are opened, the coolant exhaust control valve 66 may be re-opened, the coolant supply control valve 54 may be re-opened, and the pump 56 is turned on. Then an interval of about one minute is provided to insure that the coolant water is fully circulated through the system, and particularly the reactant channels of the CSA 11 to provide positive purges. The re-opening of the coolant supply and exhaust valves 54 and 66 is optional, but may serve to minimize the formation of gas bubbles in the fine pore plates 27, 28. These positive purges of both the fuel reactant channels 30 and the oxidant reactant channels 29 serve to displace the respective reactants, and terminate or prevent unwanted reactions at the anode 23 and cathode 22.

After the purging interval, and referring to FIG. 5E, the pump 56 is turned off, coolant supply valve 54 is closed, both supplemental coolant supply valves 54' and 54" are turned off, the coolant exhaust control valve 66 is turned off, and both supplemental coolant exhaust control valves 66', and 66" are turned off. At this point, the shutdown is complete. It will be understood that in addition to foregoing mode of purging the reactant channels by the introduction of the coolant directly into those channels from the coolant reservoir 50, the coolant may also enter those reactant channels from the fine pore plates 27, 28 as, or when, the pressure difference between the coolant channels 32 and the reactant channels 29, 30 is reduced below about 1 psi. This latter condition may occur at shutdown when the relatively greater gas pressures in the reactant channels are reduced by the closure of the reactant supply valves 44 and 48.

On start-up, it is again desirable to purge at least the fuel channel 30, and preferably, both the fuel and the oxidant reactant channels 30 and 29. Referring to FIG. 6A, the pump 56 remains off, the reactant exhaust control valves 68 and 70 are opened, and the supplemental coolant supply control valves 54' and 54" are opened, thus allowing coolant water from reservoir 50 to flow through the reactant channels 29 and 30 and exit from the CSA 11 via the respective exhaust ports 40 and 38. This flow is allowed until the coolant water is sensed at the water traps 84 and/or 86 by the respective sensors 80 and 82.

When coolant water is sensed by sensors 80 and/or 82, then, referring to FIG. 6B, the oxidant exhaust control valve 68 and the fuel exhaust control valve 70 are closed, the supplemental coolant exhaust control valves 66', and 66" are opened, the coolant supply control valve 54 is opened, the coolant exhaust control valve 66 is opened, and the pump 56 is turned on. This mode is maintained for about one minute to fully purge and inert the reactant channels 29 and 30 of the CSA 11.

Thereafter, and referring to FIG. 6C, the supplemental coolant supply control valves 54' and 54" are closed, the supplemental coolant exhaust control valves 66' and 66" are closed, the oxidant exhaust control valve 68 and the fuel exhaust control valve 70 are opened, and the oxidant supply valve 48 and the fuel supply valve 44 are opened. In this way, normal coolant circulation and reactant flow are restored. The electrical load may then be connected, or re-connected, to the stack for normal on load operation.

This start-up arrangement provides a coolant purge which minimizes or eliminates the unwanted reactions during such interval. As mentioned with respect to the shutdown process, a further purging and inerting action may be provided by coolant from the fine pore plates 27, 28 migrating into the reactant channels 29 and 30 if, and to the extent, the pressure of the respective reactant is not more than about 1 psi greater than that of the coolant.

Although the invention has been described and illustrated with respect to the exemplary embodiments thereof, it should be understood by those skilled in the art that the foregoing and various other changes, omissions and additions may be made without departing from the spirit and scope of the invention. For example, although the various principal and supplemental coolant supply and exhaust valves are depicted and described as discrete valves in separate conduits, it will be appreciated that some, or all, of those valves may be replaced with multi-way valves under appropriate control. Moreover, while the fuel cell power plant system has been shown and described as having supplemental coolant paths associated with both the fuel and the oxidant reactant flow streams such that both may be purged, a system providing for the purging of only one of those reactant flow streams may nevertheless provide a significant improvement over one without a coolant purge of either reactant flow path.

What is claimed is:

1. A method of purging a fuel cell stack (11) in a fuel cell power plant system (10) during at least one of the two transient operations of shutdown and start-up, the fuel cell stack (11) having a membrane/electrode assembly (MEA) (21,22,23), which MEA includes anode (23) and cathode (22) electrodes on respectively opposite sides of the membrane electrolyte (21), the stack (11) having a fuel reactant flow path (30) on the anode side of the MEA, an oxidant reactant flow path (29) on the cathode side of the MEA, and a coolant flow path (32,31) on at least one of the anode and the cathode sides of the MEA, the fuel reactant flow path (30), the oxidant reactant flow path (29) and the coolant flow path (32,31) each having a respective inlet to (37,39,35) and a respective outlet from (38,40,46) the stack (11), and a fuel reactant supply (42), an oxidant reactant supply (46), and a coolant supply (50) being fed to the fuel reactant inlet (37), the oxidant reactant inlet (39), and the coolant inlet (35), respectively, during normal on load operation of the fuel cell stack (11) in the system (10), the purging method comprising:

(a) feeding the coolant supply (50) to at least one of the fuel reactant inlet (37) and the oxidant reactant inlet (39) in the absence of feed of the fuel reactant supply (42) and the oxidant reactant supply (46) to the respective inlets, and (b) causing the coolant to flow in and thereby purge the respective at least one fuel reactant flow path (30) and oxidant reactant flow path (29).

2. The fuel cell stack purging method of claim 1 wherein the transient operation is shutdown, the absence of feed of the fuel reactant supply (42) and the oxidant reactant supply (46) to the respective inlets (37,39) comprises the step of terminating feed of the fuel reactant supply (42) and the oxidant reactant supply (46) to the respective inlets (37,39), and including the further steps of removing load from the cell stack (11) and reducing the feed of the coolant supply (50) to the coolant inlet (35).

3. The fuel cell stack purging method of claim 2 wherein, following termination of the supply of fuel reactant (42) to the fuel reactant inlet (37), the coolant supply (50) is fed to the fuel reactant inlet (37) to purge the fuel reactant flow path (30).

4. The fuel cell stack purging method of claim 3 wherein, following termination of the supply of oxidant reactant (46) to the oxidant reactant inlet (39), the coolant supply (50) is also fed to the oxidant reactant inlet (39) to also purge the oxidant reactant flow path (29).

5. The fuel cell stack purging method of claim 2 wherein, following termination of the supply of oxidant reactant (46) to the oxidant reactant inlet (39), the coolant supply (50) is fed to the oxidant reactant inlet (39) to purge the oxidant reactant flow path (29).

6. The fuel cell stack purging method of claim 2 wherein the fuel reactant supply (42), the oxidant reactant supply

(46) and the coolant supply (50) are each normally connected to their respective inlets (37,39,35) to the stack (10) via respective fluid conduits (43,47,52) having respective control valves (44,48,54), and the coolant supply (50) is also connected to said at least one of the fuel reactant inlet (37) and the oxidant reactant inlet (39) via a respective at least one fluid conduit (52",52') having a respective control valve (54",54'), and wherein the steps of feeding, reducing and terminating each of the respective fuel reactant, oxidant reactant and coolant supplies to said inlets to the stack each comprise selectively controlling the control valves (44,48, 54,54',54").

7. The fuel cell stack purging method of claim 2 further including:

(a) during normal on load operation, feeding to the coolant supply (50) the coolant appearing at the coolant outlet (36), and (b) during at least part of the shutdown operation, feeding to the coolant supply (50) the coolant appearing at the respective outlet (38,40) of the at least one of the fuel reactant flow path (30) and the oxidant reactant flow path (29) having the coolant supply (50) fed to its respective inlet (37,39).

8. The fuel cell stack purging method of claim 7 wherein the fuel reactant supply (42), the oxidant reactant supply (46) and the coolant supply (50) are each normally connected to their respective inlets (37,39,35) to the stack (10) via respective fluid conduits (43,47,52) having respective control valves (44,48,54), the coolant outlet (36) is normally connected to the coolant supply (50) via a respective fluid conduit (64) having a respective control valve (66), and the coolant supply (50) is also connected to said at least one of the fuel reactant inlet (37) and the oxidant reactant inlet (39) via a respective at least one fluid conduit (52",52') having a respective control valve (54",54') and is further connected, via a respective at least one fluid conduit (64", 64') having a respective control valve (66",66'), to the outlet (38,40) of the at least one of the fuel reactant flow path (30) and the oxidant reactant flow path (29) having the coolant supply (50) applied to its respective inlet (37,39), and wherein:

(a) the steps of terminating, reducing and feeding each of the respective fuel reactant (42), oxidant reactant (46) and coolant supplies (50) to said inlets to the stack are each done by selectively controlling the respective control valves (44,48,54), and (b) the step of feeding to the coolant supply (50) the coolant appearing at the respective said outlets from the stack includes selectively controlling the respective control valves (66",66',66).

9. The fuel cell stack purging method of claim 8 wherein the step of feeding to the coolant supply (50) the coolant appearing at the outlets (38,40) of the at least one of the fuel reactant flow path (30) and the oxidant reactant flow path (29) by selectively controlling the respective control valves (66",66',66) includes the steps of:

(a) sensing the presence of coolant near the respective said reactant outlets (38,40), and (b) controlling the valves (66",66',66) in response to said sensed presence of the coolant.

10. The fuel cell stack purging method of claim 9 wherein the respective outlets (38,40) for the fuel reactant flow path (30) and for the oxidant reactant flow path (29) further include exhaust conduits (62,60) containing respective control valves (70,68) for selectively controlling the passage of reactant gas exhausting from the stack (11), and including the step of controlling the respective exhaust conduit control valves (70,68) in response to the coolant being sensed near the respective said reactant outlets (38,40).

11. The fuel cell stack purging method of claim 1 wherein the transient operation is start-up, a coolant pump (56) is operatively connected to the coolant supply (50), and wherein:

(a) the step of feeding coolant to at least one of the reactant inlets in the absence of feed of the respective reactant supply to the respective reactant inlet includes the step of substantially reducing the feed of the coolant supply (50) to the coolant inlet (35), and (b) the step of causing coolant to flow in the at least one respective fuel reactant flow path (30) and oxidant reactant flow path (29) comprises initially allowing coolant to flow from the respective at least one reactant inlet to the respective reactant outlet (38,40), then sensing, near the outlet of the respective at least one reactant flow path, the arrival of coolant thereat, and, in response to the sensing of the coolant, diverting flow of the coolant exiting the respective reactant flow path outlet to the coolant supply (50) for the respective inlets and forcing the coolant to return to the coolant supply (50) and continue to flow through the respective at least one reactant flow path for an interval to complete the purge.

12. The fuel cell purging method of claim 11, including the further steps of:

(a) subsequently terminating feed of the coolant supply (50) to the at least one of the fuel reactant inlet (37) and the oxidant reactant inlet (39);

(b) feeding coolant to the coolant inlet (35);

(c) feeding the fuel reactant supply (42) to the fuel inlet (37);

(d) feeding the oxidant reactant supply (46) to the oxidant inlet (39);

(e) causing the coolant, the fuel reactant, and the oxidant reactant to flow in the respective flow paths (32,30,29); and (f) connecting load to the cell stack (11).

13. In a fuel cell power plant system (10), a purge system for a fuel cell stack (11) comprising:

(a) the fuel cell stack (11) having a membrane/electrode assembly (MEA)(21,22,23), which MEA includes anode (23) and cathode (22) electrodes on respectively opposite sides of the membrane electrolyte (21), the stack (11) having a fuel reactant flow path (30) on the anode side of the MEA, an oxidant reactant flow path (29) on the cathode side of the MEA, and a coolant flow path (32,31) on at least one of the anode and the cathode sides of the MEA, the fuel reactant flow path (30), the oxidant reactant flow path (29) and the coolant flow path (32,31) each having a respective inlet to (37,39,35) and a respective outlet from (38,40,46) the stack (11);

(b) a fuel reactant supply (42);

(c) an oxidant reactant supply (46);

(d) a coolant supply (50);

(e) valved supply conduits (43,44,47,48,52,54,52',54',52", 54") for selectively connecting:

(i) the fuel inlet (37) with either of the fuel reactant supply (42) and the coolant supply (50), (ii) the oxidant reactant inlet (39) with either of the oxidant reactant supply (46) and the coolant supply (50), and (iii) the coolant inlet (35) with the coolant supply (50);

(f) valved exhaust conduits (64,66,62,70,64",66",60,68, 64', 66') for selectively connecting:
  (i) the coolant outlet (36) to the coolant supply (50),
  (ii) the fuel reactant outlet (38) to either of the coolant supply (50) and a fuel exhaust (70), and
  (iii) the oxidant reactant outlet (40) to either of the coolant supply (50) and an oxidant exhaust (68); and (g) control means (72,80,82,84,86) for selectively controlling the valved supply conduits and the valved exhaust conduits to effect, during normal on load operation, flow of the fuel and oxidant reactants through the respective reactant flow paths and coolant through the coolant flow path, and, during transient operation of shutdown or start-up, flow of coolant through at least one of the fuel reactant flow path and the oxidant reactant flow path in lieu of flow of the respective reactant therethrough, to thereby purge the respective reactant flow path.

14. The fuel cell power plant purge system of claim 13 wherein the control means (72,80,82,84,86) includes coolant sensing means (82,80) proximate the outlet of the at least one of the reactant flow paths to be purged, for indicating the presence of coolant thereat to thereby inhibit flow of the coolant through the respective reactant exhaust (68,70).

* * * * *